L. A. BIGGAR.
BUSHING.
APPLICATION FILED OCT. 20, 1910.
1,156,582.
Patented Oct. 12, 1915.
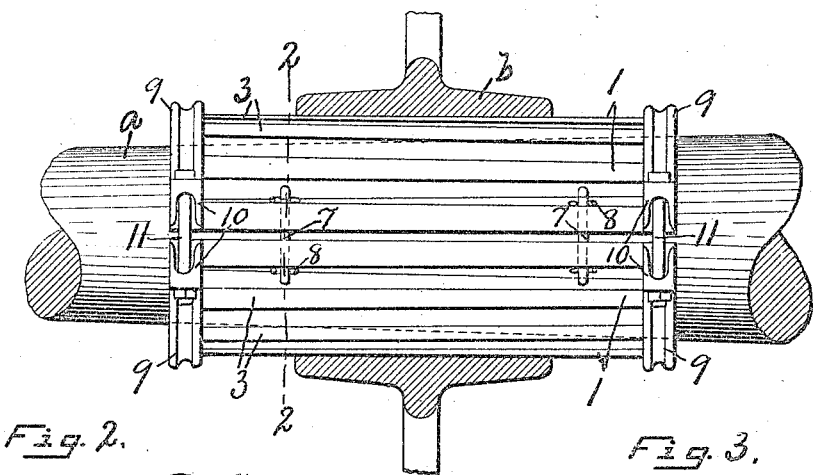
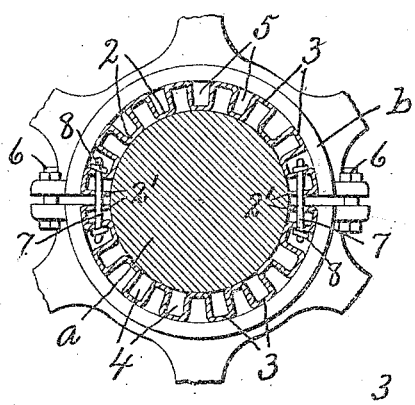
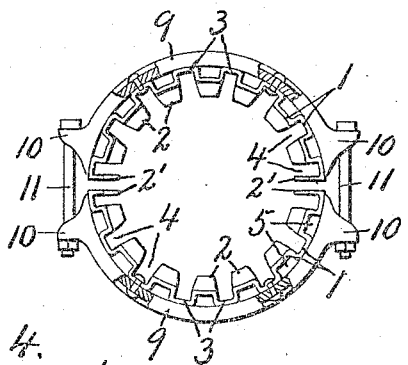
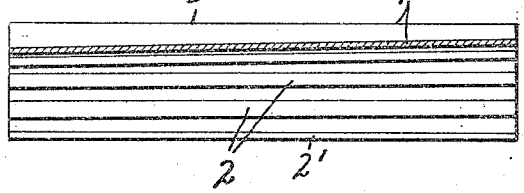
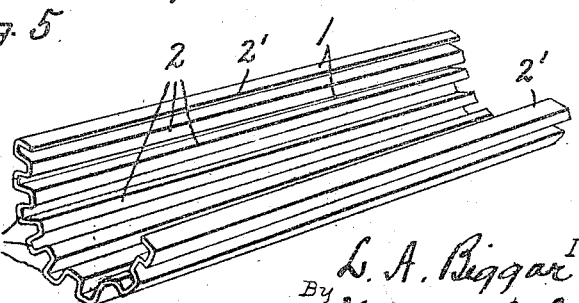
Witnesses:
R.W. Bailey.
H. E. Chase
Inventor:
L. A. Biggar
By Howard P. Davidson
Attorney.

UNITED STATES PATENT OFFICE.

LEROY A. BIGGAR, OF ONEIDA, NEW YORK.

BUSHING.

1,156,582.  Specification of Letters Patent.  Patented Oct. 12, 1915.

Application filed October 20, 1910. Serial No. 588,043.

*To all whom it may concern:*

Be it known that I, LEROY A. BIGGAR, of Oneida, in the county of Madison, in the State of New York, have invented new and useful Improvements in Bushings, of which the following, taken in connection with the accompanying drawings, is a full, clear, and exact description.

This invention relates to certain improvements in bushings for tight split pulleys and although it is shown as adapted to be used more particularly in connection with tapering shafts or axles of electric cars for driving a dynamo or other mechanism on the car, the invention broadly may be used in connection with a cylindrical shaft and any other form of split hub or collar.

The main object is to provide a comparatively light yet strong and durable bushing which is sufficiently flexible transversely or circumferentially at all points to enable it to be clamped between the shaft and pulley with more uniform contact and greater gripping power than would be possible with cast metal or less flexible bushings. In other words, I have sought to provide a bushing which will conform more readily to the contours of the shaft and pulley with which it is engaged under clamping pressure of the sections of the pulley.

Another object is to enable the bushing to be used in connection with cylindrically bored hubs and tapering shafts or axles without adding materially to the weight of the bushing.

Other objects and uses relating to specific parts of the device will be brought out in the following description.

In the drawings Figure —1— is a side elevation of my improved bushing as used in connection with a tapering shaft or axle and a cylindrically bored hub. Fig. —2— is a transverse sectional view taken on line 2—2, Fig. —1—. Fig. —3— is an end view of the detached bushing. Fig. —4— is a longitudinal sectional view of one of the bushing sections. Fig. —5— is a perspective view of one of said sections.

This bushing comprises a pair of oppositely disposed substantially semi-cylindrical sheet metal sections —1— which are corrugated transversely at regular intervals to form inwardly projecting ribs —2— and outwardly projecting ribs —3— alternating with each other and producing intervening grooves —4— and —5—. When these bushing sections are placed upon a shaft as —a— and within the hub of a pulley —b— they form a substantially cylindrical shell which is corrugated transversely in the manner described, the opposite longitudinal edges of each section being bent inwardly to form opposite ribs —2'— at the meeting edges and corresponding to the ribs —2—.

When used in connection with a tapering portion of a shaft or axle as —a— and a cylindrically bored hub as —b— the outwardly projecting ribs —3— are parallel with the axis of the bushing while the inwardly projecting ribs —2— are tapered or inclined from one end toward the other thereby forming a tapering opening which conforms to the taper of the shaft.

The transverse width of the ribs —2— is somewhat less than that of the ribs —3— thereby affording a greater combined circumferential length of contact with the correspondingly increased length of circumference of the interior of the hub —b— and a more reduced combined circumferential length of contact for the lesser circumference of the axle or shaft —a—.

The grooves —4— and —5— intervening between the ribs —2— and —3— afford ample space for flexing action of the bushing sections and by alternating the ribs and grooves in the manner described, a sufficient flexibility is afforded to permit all of the ribs and all portions thereof to be readily compressed into close contact with the corresponding surfaces of the axle and hub when the latter is clamped in operative position upon the bushing by suitable clamping bolts as —6—. Each rib therefore constitutes a separate gripping device engaging the shaft and hub of the pulley throughout its entire length so that the entire bushing may be said to comprise a plurality of gripping elements or ribs yieldingly connected to each other, whereby all of the gripping elements may be brought into firm engagement with the said shaft and hub as the latter is drawn up or tightened by the bolts —6—.

In order that the bushing sections may be properly placed and held upon the shaft preparatory to receiving the pulley, the ribs —3— nearest the meeting edges of the sections may be provided with transverse bolt openings for the reception of clamping bolts —7—, the ends of which project into the adjacent grooves —5— and are provided with retaining shoulders —8—, preferably in the form of cotter pins which are passed through apertures in the ends of the bolts but it is evident that any other suitable retaining shoulders may be employed.

In some instances the ends of the bushing sections will be provided with ring segments —9— riveted or otherwise secured thereto and formed with apertured lugs —10— for the reception of clamping bolts —11— for the purpose of clamping the bushing sections on the shaft preparatory to receiving the pulley sections —b—.

The clamping bolts —7— and also the segments —9— and their clamping bolts —11— may be used as additional means for clamping the bushing on the shaft so as to afford a more positive grip on the smaller area of the shaft than that of the pulley, thus preventing slipping of the bushing thereon and at the same time drawing all of the ribs into close contact with the shaft so that, when the pulley is clamped in place, it will additionally set the ribs firmly in contact with both the shaft and interior of the hub of the pulley.

In operation the bushing sections are first placed in operative position upon the shaft and clamped in place by the bolts —7— or —11— after which the pulley sections are brought into position upon the bushing and clamped by the bolts —6— until the contact portions of all the ribs are firmly set against the corresponding surfaces of the shaft and pulley.

The device is particularly useful on the tapering axles of electric cars for the reception of a driving pulley for a dynamo or other revolving element to which it may be desired to transmit motion from the axle.

What I claim is:

A sheet metal bushing for pulleys composed of similar half sections corrugated transversely from edge to edge and having their corrugations deeper at one end than at the opposite end, and separate devices for clamping the ends of the sections upon a shaft.

In witness whereof I have hereunto set my hand on this 11 day of October, 1910.

LEROY A. BIGGAR.

Witnesses:
JOHN F. LOOMIS,
JOSEPH McCOSKER.